Dec. 6, 1927.
D. E. GAMBLE
CLUTCH PLATE
Filed Jan. 24, 1927
1,652,005
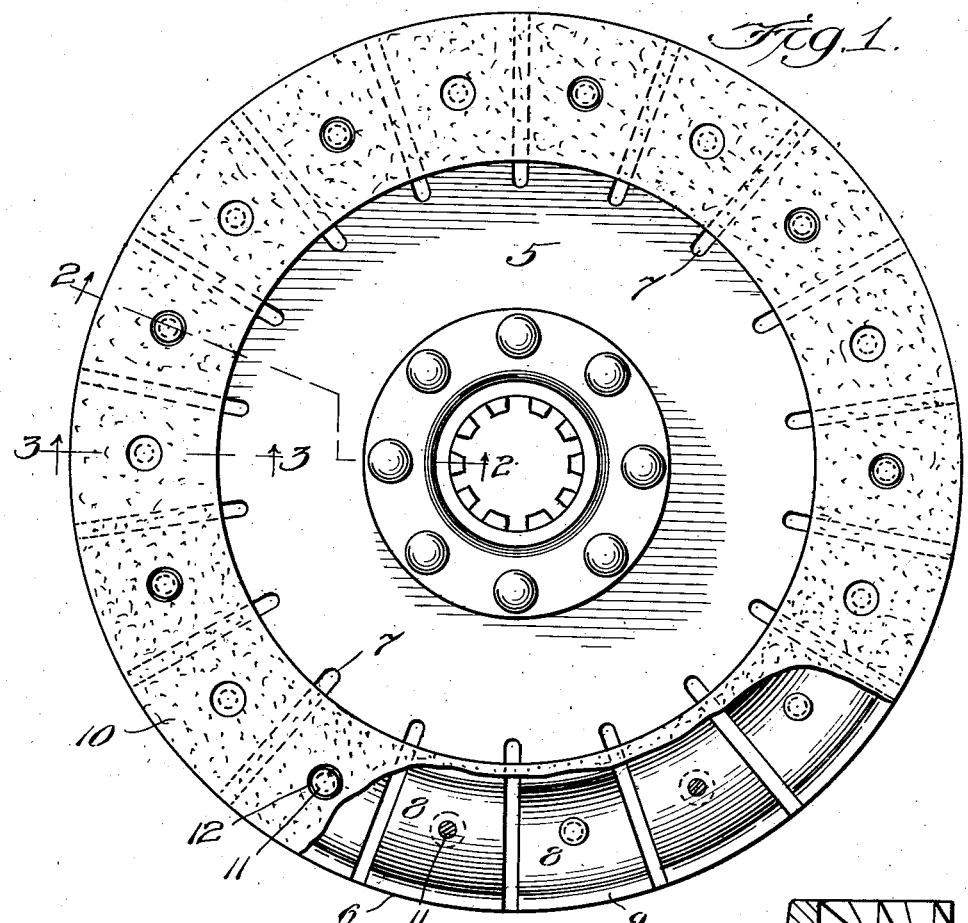
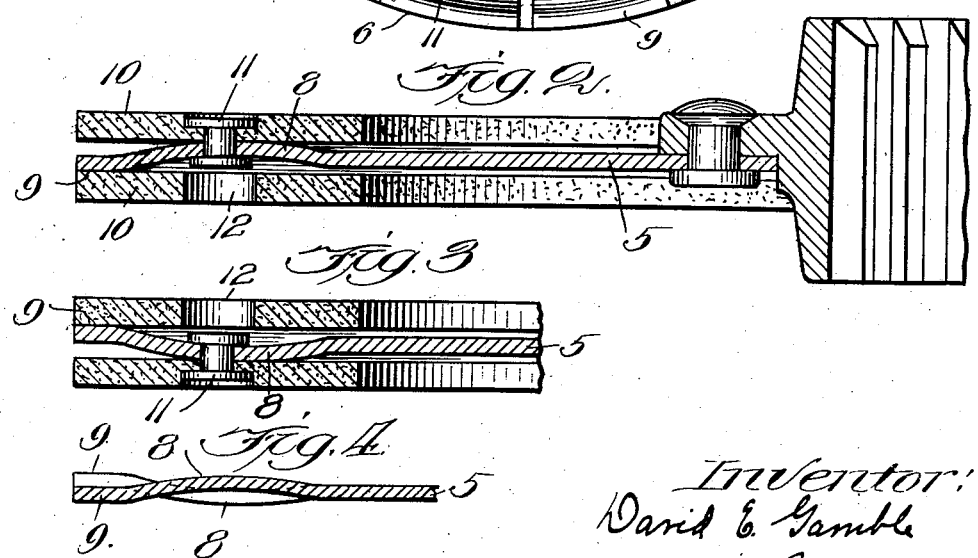
Inventor:
David E. Gamble
by Wm. O. Bell
Atty Patented Dec. 6, 1927.

1,652,005

UNITED STATES PATENT OFFICE.

DAVID E. GAMBLE, OF DETROIT, MICHIGAN, ASSIGNOR TO THE BORG & BECK COMPANY, OF CHICAGO, ILLINOIS, A CORPORATION OF ILLINOIS.

CLUTCH PLATE.

Application filed January 24, 1927. Serial No. 163,081.

This invention relates to friction clutches of the kind wherein a friction plate driven member is interposed between two parts of a driving member and is adapted to be gripped or clamped by said parts under sufficient pressure to impart motion from the driving member to the driven member.

The object of the invention is to provide a novel clutch plate with friction rings which will take hold smoothly and evenly throughout their contact area when pressure is initially applied, and by a yielding but rapid progressive action make the clutch act quickly and efficiently without grabbing or jerking.

And a further object of the invention is to provide for full engagement between the friction rings and the driving and driven members throughout the application of pressure to secure maximum efficiency in a rapid progressive movement and without uneven wear on the rings.

In the accompanying drawings I have illustrated a selected embodiment of the invention, and referring thereto, Fig. 1 is a side elevation of the clutch plate showing one of the friction rings partly broken away.

Fig. 2 is an enlarged sectional view on the line 2—2 of Fig. 1.

Fig. 3 is a similar view on the line 3—3 of Fig. 1.

Fig. 4 is an enlarged sectional view through one of the sectors of the plate and showing the adjacent edge of another sector.

In the drawings, the clutch plate 5 is divided into a plurality of sectors 6 by radial slots 7 which extend through the periphery of the plate.

Alternate sectors are bent in a direction extending radially of the plate to provide bows 8 which project on opposite sides of the plate. The outer marginal portions 9 of the sectors are flat and are positioned in staggered relation by reason of the bowed portions so that the outer face of the flat marginal portion of one sector will lie slightly beyond the plane of the central portion of that side of the plate, and the outer face of the marginal portion of the adjacent sector will lie beyond the plane of the central portion of the other side of the plate (Fig. 4).

I employ hard, solid, continuous friction rings 10 which are arranged on opposite sides of the plate and are fastened by rivets 11 or other suitable fastening means to the projecting bows of alternate sectors at or about the middle of the bows. Thus, one ring is fastened to alternate sectors and the other ring is fastened to the other sectors, and in released position of the clutch the marginal portion 9 of each sector engages the ring to which the sector is not fastened. Recesses which may be conveniently made in the form of openings 12 are provided in each ring to accommodate the ends of the rivets which fasten the other ring to the sectors so that the bowed portions may be flattened under pressure to provide even engagement throughout the contacting faces of the sectors and the rings.

My improved clutch plate is a driven member adapted to be arranged between two parts of a driving member of a clutch to be gripped and clamped thereby for imparting motion from the driving member to the driven member. The outer faces of the friction rings make engagement throughout their entire area with the parts of the driving member when the pressure is initially applied, and the bows of the sectors provide for a yielding, gripping or clamping engagement between the friction rings of the plate and the parts of the driving member of the clutch to insure that the clutch will take hold smoothly and easily when thrown in. The full engagement between each friction ring and a clutch member prevents uneven wear of the rings and prolongs the life of the ring; and the yielding rapid progressive action of the rings provides a clutch which acts quickly without grabbing or jerking.

I claim:

1. A clutch plate having a plurality of radial slots extending inward from its periphery and providing a plurality of sectors, alternate sectors being bowed and continuous friction rings arranged on opposite sides of said plate and connected to alternate sectors.

2. A clutch plate having a plurality of radial slots extending inward from its periphery and providing a plurality of sectors, alternate sectors being bowed radially, a continuous friction ring on one side of the plate connected to alternate sectors, and a continuous friction ring on the other side of the plate connected to the other sectors.

3. A clutch plate having a plurality of radial slots extending inward from its periphery and providing a plurality of sectors, continuous friction rings arranged on opposite sides of said sectors, and rivets connecting each ring with alternate sectors, each ring being provided with a recess opposite each rivet to receive the end of the rivet.

4. A clutch plate having a plurality of radial slots extending inward from its periphery and providing a plurality of sectors, said sectors being alternately and oppositely bowed, and continuous friction rings arranged on opposite sides of the plate and connected to the outwardly bowed sectors.

5. A clutch plate having a plurality of radial slots extending inward from its periphery and providing a plurality of sectors, the sectors being alternately and oppositely bowed radially of the plate, and continuous friction rings arranged on opposite sides of the plate and connected to the outwardly bowed sectors.

6. A clutch plate having a plurality of radial slots extending inward from its periphery and providing a plurality of sectors, the sectors being alternately and oppositely bowed, continuous friction rings on opposite sides of the plate, and fastening means located centrally in the bows of the sectors and connected to the rings with which said bows engage.

7. A clutch plate having a plurality of radial slots extending inward from its periphery and providing a plurality of sectors, the sectors being alternately bowed, and continuous friction rings arranged on opposite sides of the plate connected to the outwardly bowed sectors, the outer margins of each sector being flat and offset to engage the ring with which it is not connected.

DAVID E. GAMBLE.